Patented Mar. 15, 1932

1,849,985

UNITED STATES PATENT OFFICE

OTTO LIEBKNECHT, OF NEUBABELSBERG, GERMANY, ASSIGNOR TO THE PERMUTIT COMPANY, OF NEW YORK, N. Y., A CORPORATION OF DELAWARE

WATER SOFTENING GELS

No Drawing. Application filed February 25, 1931, Serial No. 518,286, and in Germany November 12, 1929.

Applications have been filed in Germany on November 12, 1929, December 20, 1929, and January 13, 1930.

This invention relates to improving water softening gels; and it comprises an improvement in producing dry base exchange silicate or zeolite gels from wet gels formed in the usual ways and dried in the usual manner, with or without pressure to express mother liquor; said improvement comprising a washing treatment of the gel, prior to final drying, with a solution of a saline electrolyte such as common salt, said saline electrolyte solution being advantageously, but not necessarily, neutral in reaction and said washing treatment being sometimes followed by a treatment with dilute alkaline solutions; all as more fully hereinafter set forth and as claimed.

In the water softening art, zeolites are frequently made by interaction of various solutions to produce jellies or other gels; the jelly being then dried, with or without washing. Sometimes the gel is pressed to express mother liquor. The reacting liquids usually employed are solutions of sodium silicate and sodium aluminate or aluminum sulfate. Iron salts are sometimes used instead of aluminum salts. On mixing a solution of sodium silicate with sodium aluminate a jelly is produced containing hydrated alumina and hydrated silica and also soda; a sodium aluminosilicate, it is sometimes called. The mother liquor contains caustic soda. By using aluminum sulfate in lieu of some or all of the sodium aluminate, a similar precipitate or jelly is obtained but the mother liquor in this case contains sodium sulfate and, advantageously, some free alkali originating from an excess of sodium silicate.

In an advantageous way of making gelled zeolites, the wet gel with or without pressing, is dried, more or less completely as a cake, which upon wetting with water decrepitates or snaps up into granules. By suitable regulation of conditions these granules may be of a size suitable for use in a softener. This method is often used. The breaking up is supposed to be mainly due to the presence of alkaline or highly saline mother liquor, the wash water following seams or liquid lines produced in drying. However strains produced by contraction in drying play some part undoubtedly.

I have found that the presence of highly alkaline or highly saline liquids in the cake at the time of drying is not necessary; that an equally advantageous snapping up or granulation ensues in the presence of mother liquors which are much less alkaline and saline. And this presence of weak solutions in the cake, as I have found, has a number of distinct advantages. For one thing, while an alkaline mother liquor in the concentration incident to drying the cake tends to redissolve silica, this is not true of weak saline solutions. For another thing, weak saline solutions do not effloresce nor tend to disintegrate the cake as do stronger saline and alkaline solutions and displacement of mother liquor in the wet gel by a saline solution facilitates both pressing and drying of the gels. Furthermore, after the saline treatment or sometimes coincident therewith, a treatment of the gel with alkaline solutions sometimes improves the base exchange properties of the gel products without affecting adversely the ruggedness of the dry gel granules which is important to their extended use in commercial water softening apparatus. It has also been found that when the wet gel is to be washed with a saline solution, it is possible to use relatively more concentrated reagents in forming the gel.

Treatment of the wet gels with a saline solution under the present invention may be effected at any stage in the process of manufacture after the wet gel is formed from its reagent solutions and before final drying of the gel to produce commercial granules. When the reagent solutions form a jelly or a more or less homogeneous gel, the wet gel may be allowed to soak in a salt solution for sufficient time to allow diffusion of the salt solution through the mass of the gel. But usually I find it more advantageous to press the wet gel by suitable means, expressing from the gel a portion of its mother liquor, and to treat the press cake with a saline solution. Suitable means for pressing the wet gel can be provided as a filter press or a hydraulic press and the press cake may be washed with a salt solution while still in the press or the cake may be soaked in salt solution after removal from the press. The purpose of the saline treatment is met by any procedure which serves to displace the excess of reagent liquid adhering to the gel. Sometimes the purpose is served by a rather dilute solution such as a 1 or 2 per cent solution of common salt. Usually however, a somewhat more concentrated solution is better. I have found that usually a sulfate solution has a better effect in the process than a chlorid solution and that alkali salts in general serve the desired purpose. But any available saline electrolyte may be used. A 10 per cent solution of neutral sodium sulfate gives good results. Usually the saline solution should be neutral in reaction to ordinary indicators but a solution of slightly acid reaction does no harm in certain cases and in others a small amount of alkali in the saline solution has a beneficial effect. It is possible to wash press cakes with dilute solutions of alkaline earth salts such as calcium chlorid or magnesium sulfate. But in this case it is necessary to subject the dried gel after granulation and before use in water softening to a regenerating treatment in the usual way with a common salt brine.

After treatment of the wet gel, before, during or after pressing, with a saline solution, whereby the excess of the usually alkaline reagent solution mixture is displaced and replaced by neutral salt solution, the gel cake is dried in the usual manner at a moderate temperature, usually under 100° C., advantageously at about 80° C. and the dried gel cake is wetted with water in the usual way to effect decrepitation with granulation. Granulation of the gel in this way into grain sizes suitable for water softening use is, as I have found, not interfered with by the mother liquor replacement and in many cases is improved by way of reducing percentage of fines and by increasing uniformity of grain size.

In the case of a gel formed from the usual reagents mixed in such proportions as to produce a gel containing a deficiency of alkali, it is possible to treat such a gel after the saline treatment with alkaline solutions in order to raise the alkali content of the gel to the required proportion. For example, when a gel is formed by mixing solutions of aluminum sulfate and of sodium silicate it is sometimes economical to mix these reagents in such proportions that the soda of the silicate is not sufficient to supply a mol of $Na_2O$ for each mol $Al_2O_3$ in the solution mixture in addition to the soda required to neutralize the acid of the sulfate. In such a case the gel mixture may show an alkaline reaction but may not contain the optimum proportion of soda for water softening purposes. It has been found that the drying and granulation of such a gel is benefited by a saline treatment and that after the saline treatment, either before or after drying the gel, a treatment of the gel with a dilute solution of caustic soda or silicate or aluminate of soda brings up the $Na_2O$ content and increases the base exchange power of the product. It has been found that washing a gel zeolite with a salt solution makes it possible to treat the gel subsequently with alkali without injury to the gel surfaces or to its physical ruggedness and resistance to abrasion in extended use.

It has been found that gel zeolites formed from aluminum sulfate and sodium silicate and containing high ratios of silica content are substantially improved by treatment first with a dilute salt solution as above described and then with a solution of aluminate of soda either before drying or after drying and granulating the gel. As a rule the high silica zeolite gels made from aluminum sulfate as the source of alumina are physically strong and rugged, but they are sometimes somewhat lacking in base exchange capacity. The saline treatment followed by digestion with sodium aluminate in solution brings up the base exchange power and the final products possess a combination of properties particularly valuable in commercial water softening. Excellent water softening gels can be obtained by impregnating granular silica gels and alumina-silica gels first with sodium silicate solution and then with sodium aluminate solution.

To recapitulate, my invention comprises a discovery that a gel zeolite is improved in both its chemical and physical action in extended use for water softening when the wet gel formed from gelling reagent mixtures is soaked in a relatively dilute salt solution so that the original mother liquor in the gel is displaced by the salt solution. Among the benefits resulting from this saline treatment is a resistance of the gel structure to disintegration by alkalies and I may take advantage of this resistance to alkalies conferred in the salt treatment by treating the gel with a solution of an alkali after the salt treatment in order to increase the alkali content of the gel and thus its base-exchange capacity. This treatment with alkali is made in usual ways and it may be given at any stage of the process after the saline treatment and either before or after drying the gel. In most cases it is advantageous to soak the dried gel in a dilute alkali solution. But I have found in some cases that good results are obtained by giving the gel an alkaline treatment either coincident with or immediately succeeding the saline treatment and before drying the gel. So doing, a little alkali may be added to the salt solution or after the saline treatment the salt solution impregnating the gel may be replaced by a dilute solution of an alkali such as caustic soda, aluminate of soda or silicate of soda. The alkali treatment is particularly advantageous in the case in the case of a gel made from water glass and a compound of a metal with an acid, a compound such, for example, as an aluminum sulfate or an iron chlorid.

What I claim is:

1. In manufacturing a water softening zeolite from a gelling mixture of an alkali silicate solution and a solution of an aluminum or an iron compound, a process which comprises displacing residual reagent liquid in the wet gel with a salt solution, drying the salt impregnated gel and granulating the dried gel by treatment with water.

2. In manufacturing a water softening zeolite from a gelled mixture of an alkali silicate solution and a solution of a compound of aluminum or iron with an acid, a process which comprises displacing residual reagent liquid in the wet gel with a salt solution, treating the salt impregnated gel with a dilute solution of an alkali and subsequently drying the gel and granulating the dried gel by treatment with water.

3. In manufacturing a water softening zeolite from a gelled mixture of an alkali silicate solution and a solution of an aluminum or an iron compound, a process which comprises displacing residual reagent liquid in the wet gel with a salt solution, drying the salt impregnated gel and substantially treating the gel with a dilute solution of an alkali.

In testimony whereof I affix my signature.

OTTO LIEBKNECHT.

CERTIFICATE OF CORRECTION.

Patent No. 1,849,985.                                Granted March 15, 1932, to

OTTO LIEBKNECHT.

It is hereby certified that error appears in the printed specification of the above numbered patent requiring correction as follows: Page 3, line 5, strike out the words "in the case" second occurrence, and line 35, claim 3, for "substantially" read subsequently; and that the said Letters Patent should be read with these corrections therein that the same may conform to the record of the case in the Patent Office.

Signed and sealed this 26th day of April, A. D. 1932.

(Seal)

M. J. Moore,
Acting Commissioner of Patents.